US012744045B2

(12) United States Patent
Erdogan et al.

(10) Patent No.: US 12,744,045 B2
(45) Date of Patent: Sep. 22, 2026

(54) USING MACHINE LEARNING AND DISCRETE TOKENS TO ESTIMATE DIFFERENT SOUND SOURCES FROM AUDIO MIXTURES

(71) Applicant: Google LLC, Mountain View, CA (US)

(72) Inventors: Hakan Erdogan, Lexington, MA (US); Scott Thomas Wisdom, Boston, MA (US); John Hershey, Winchester, MA (US); Zalán Borsos, Zurich (CH); Marco Tagliasacchi, Ruvigliana (CH); Neil Zeghidour, Paris (FR); Xuankai Chang, Pittsburgh, PA (US)

(73) Assignee: Google LLC, Mountain View, CA (US)

( * ) Notice: Subject to any disclaimer, the term of this patent is extended or adjusted under 35 U.S.C. 154(b) by 218 days.

(21) Appl. No.: 18/233,323

(22) Filed: Aug. 13, 2023

(65) Prior Publication Data

US 2025/0054500 A1 Feb. 13, 2025

(51) Int. Cl.

| | |
|---|---|
| ***G10L 17/18*** | (2013.01) |
| ***G10L 17/02*** | (2013.01) |
| ***G10L 17/04*** | (2013.01) |
| ***G10L 17/06*** | (2013.01) |
| ***G10L 17/20*** | (2013.01) |

(52) U.S. Cl.
CPC .............. *G10L 17/20* (2013.01); *G10L 17/02* (2013.01); *G10L 17/04* (2013.01); *G10L 17/06* (2013.01); *G10L 17/18* (2013.01)

(58) Field of Classification Search
None
See application file for complete search history.

(56) References Cited

U.S. PATENT DOCUMENTS

| | | | | |
|---|---|---|---|---|
| 8,332,223 | B2 * | 12/2012 | Farrell | G10L 17/00 704/246 |
| 12,039,981 | B2 * | 7/2024 | Dong | G10L 17/06 |
| 2014/0142940 | A1 * | 5/2014 | Ziv | G10L 17/02 704/235 |
| 2015/0025887 | A1 * | 1/2015 | Sidi | G10L 17/02 704/245 |
| 2020/0211544 | A1 * | 7/2020 | Mikhailov | G10L 15/16 |
| 2020/0349950 | A1 * | 11/2020 | Yoshioka | G10L 15/08 |
| 2022/0254351 | A1 * | 8/2022 | Jung | G06F 40/216 |
| 2023/0042310 | A1 * | 2/2023 | Wexler | G06F 1/3278 |
| 2023/0089308 | A1 * | 3/2023 | Wang | G10L 15/063 704/232 |

(Continued)

OTHER PUBLICATIONS

Dong, Linhao, and Bo Xu. “Cif: Continuous integrate-and-fire for end-to-end speech recognition.” ICASSP 2020-2020 IEEE International Conference on Acoustics, Speech and Signal Processing (ICASSP). IEEE, 2020. (Year: 2020).*

(Continued)

*Primary Examiner* — Douglas Godbold
(74) *Attorney, Agent, or Firm* — Lowenstein Sandler LLP

(57) ABSTRACT

A system and method are disclosed. Audio input comprising the mixed audio signals is received by one or more client devices. The audio input is converted into a plurality of discrete tokens. A plurality of sound sources, each corresponding to a subset of discrete tokens of a plurality of subsets of discrete tokens, is determined using a trained machine learning model.

19 Claims, 6 Drawing Sheets

(56) References Cited

U.S. PATENT DOCUMENTS

| | | | | |
|---|---|---|---|---|
| 2023/0115271 | A1* | 4/2023 | Wang | G10L 25/87<br>704/200 |
| 2024/0005941 | A1* | 1/2024 | Xu | G10L 25/30 |
| 2024/0029709 | A1* | 1/2024 | Cai | G10L 15/26 |
| 2024/0135934 | A1* | 4/2024 | Zhao | G10L 15/16 |
| 2025/0118298 | A1* | 4/2025 | Muntasir | H04M 3/4936 |

OTHER PUBLICATIONS

Devlin, Jacob, et al. "Bert: Pre-training of deep bidirectional transformers for language understanding." Proceedings of the 2019 conference of the North American chapter of the association for computational linguistics: human language technologies, vol. 1 (long and short papers). 2019. (Year: 2019).*

Anidjar, Or Haim, et al. "Hybrid speech and text analysis methods for speaker change detection." IEEE/ACM Transactions on Audio, Speech, and Language Processing 29 (2021): 2324-2338. (Year: 2021).*

* cited by examiner

USING MACHINE LEARNING AND DISCRETE TOKENS TO ESTIMATE DIFFERENT SOUND SOURCES FROM AUDIO MIXTURES

TECHNICAL FIELD

Aspects and implementations of the present disclosure relate to sound separation, and in particular to using machine learning and discrete tokens to estimate different sound sources from audio mixtures.

BACKGROUND

In various fields such as telecommunications, voice recognition, and audio transcription, the need to separate individual sound sources (e.g., speech sources) from complex audio mixtures has become increasingly important. Conventional audio systems often struggle to isolate and enhance audio signals, particularly in challenging acoustic environments with background noise, overlapping speech, and reverberation.

Existing sound separation techniques typically involve training neural networks on artificial mixtures of isolated speech to estimate individual sound sources. However, these techniques have limitations in terms of accuracy, robustness, and computational complexity. They often struggle to accurately separate individual sound sources and may introduce artifacts or distortions in the process that impact perceptual quality and may be harmful to downstream tasks such as speech recognition.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a system and method are disclosed for using machine learning and discrete tokens to estimate (e.g., identify) different sound sources from audio mixtures. In an implementation, a method includes receiving audio input comprising mixed audio signals provided by one or more client devices. The audio input is converted into a plurality of discrete tokens. The method further includes determining, using a trained machine learning model, a plurality of sound sources each corresponding to a subset of discrete tokens of a plurality of subsets of discrete tokens.

In some embodiments, the plurality of discrete tokens comprises a plurality of semantic tokens, and to convert the audio input into the plurality of discrete tokens, the method further includes providing, to a second machine learning model, input comprising the audio input; and obtaining, from the second machine learning model, one or more outputs identifying the plurality of semantic tokens.

In some embodiments, the plurality of discrete tokens comprises a plurality of acoustic tokens, and to convert the audio input into the plurality of discrete tokens, the method further includes providing, to a second machine learning model, input comprising the audio input; and obtaining, from the second machine learning model, one or more outputs identifying the plurality of acoustic tokens.

In some embodiments, the method further includes providing, to the trained machine learning model, first input comprising the plurality of discrete tokens and second input comprising another plurality of discrete tokens, wherein each of the plurality of discrete tokens and the other plurality of discrete tokens comprises at least one of: a plurality of acoustic tokens and a plurality of semantic tokens.

In some embodiments, the method further includes providing, to the trained machine learning model, second input comprising one or more of: one or more transcripts corresponding to the audio input, one or more audio descriptions corresponding to the audio input, one or more class identities corresponding to the audio input, and one or more captions corresponding to the audio input.

In some embodiments, the method further includes obtaining, from the trained machine learning model, one or more outputs identifying one or more transcripts corresponding to the audio input.

In some embodiments, the method further includes providing, to a third trained machine learning model, input comprising a plurality of waveforms corresponding to the audio input, wherein the plurality of waveforms are generated using a time-domain convolutional neural network, and wherein the plurality of waveforms pertains to a first sound source of the plurality of sound sources. The method further includes obtaining, from the third trained machine learning model, one or more outputs identifying a first plurality of acoustic tokens corresponding to the plurality of waveforms. The method further includes providing, to the trained machine learning model, second input comprising the first plurality of acoustic tokens corresponding to the plurality of waveforms. The method further includes obtaining, from the trained machine learning model, one or more outputs identifying a second plurality of acoustic tokens, wherein the second plurality of acoustic tokens comprises the first plurality of acoustic tokens with a removal of one or more distortions or artifacts from the first plurality of acoustic tokens.

In an implementation, a method for training a machine learning model using information identifying a plurality of sound sources from audio input comprising mixed audio signals provided by one or more client devices includes generating training data for the machine learning model, wherein generating the training data comprises generating first training input, the first training input comprising a plurality of discrete tokens corresponding to the audio input; and generating a first target output for the first training input, wherein the first target output identifies a sound source for a subset of discrete tokens of the plurality of discrete tokens. The method further includes providing the training data to train the machine learning model on (i) a set of training inputs comprising the first training input, and (ii) a set of target outputs comprising the first target output paired with the first training input.

In some embodiments, to generate the first training input, the method includes splitting the mixed audio signals into a plurality of portions, each portion having a predefined length of time. The method further includes providing, to a second machine learning model, input comprising the plurality of portions. The method further includes obtaining, from the second machine learning model, one or more outputs identifying the plurality of discrete tokens, the plurality of discrete tokens comprising a plurality of semantic tokens.

In some embodiments, to generate the first training input, the method includes splitting the mixed audio signals into a plurality of portions, each portion having a predefined length of time. The method further includes providing, to a second machine learning model, input comprising the plurality of portions. The method further includes obtaining, from the second machine learning model, one or more outputs identifying the plurality of discrete tokens, the plurality of discrete tokens comprising a plurality of acoustic tokens.

In some embodiments, to generate the first training input, the method further includes applying a first predefined masking pattern to each type of discrete token of the plurality of discrete tokens. The method further includes applying a second predefined masking pattern to a pseudo-random segment of discrete tokens of the plurality of discrete tokens.

In some embodiments a system comprises: a memory; and a processing device operatively coupled with the memory to perform operations comprising a method according to any embodiment or aspect described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
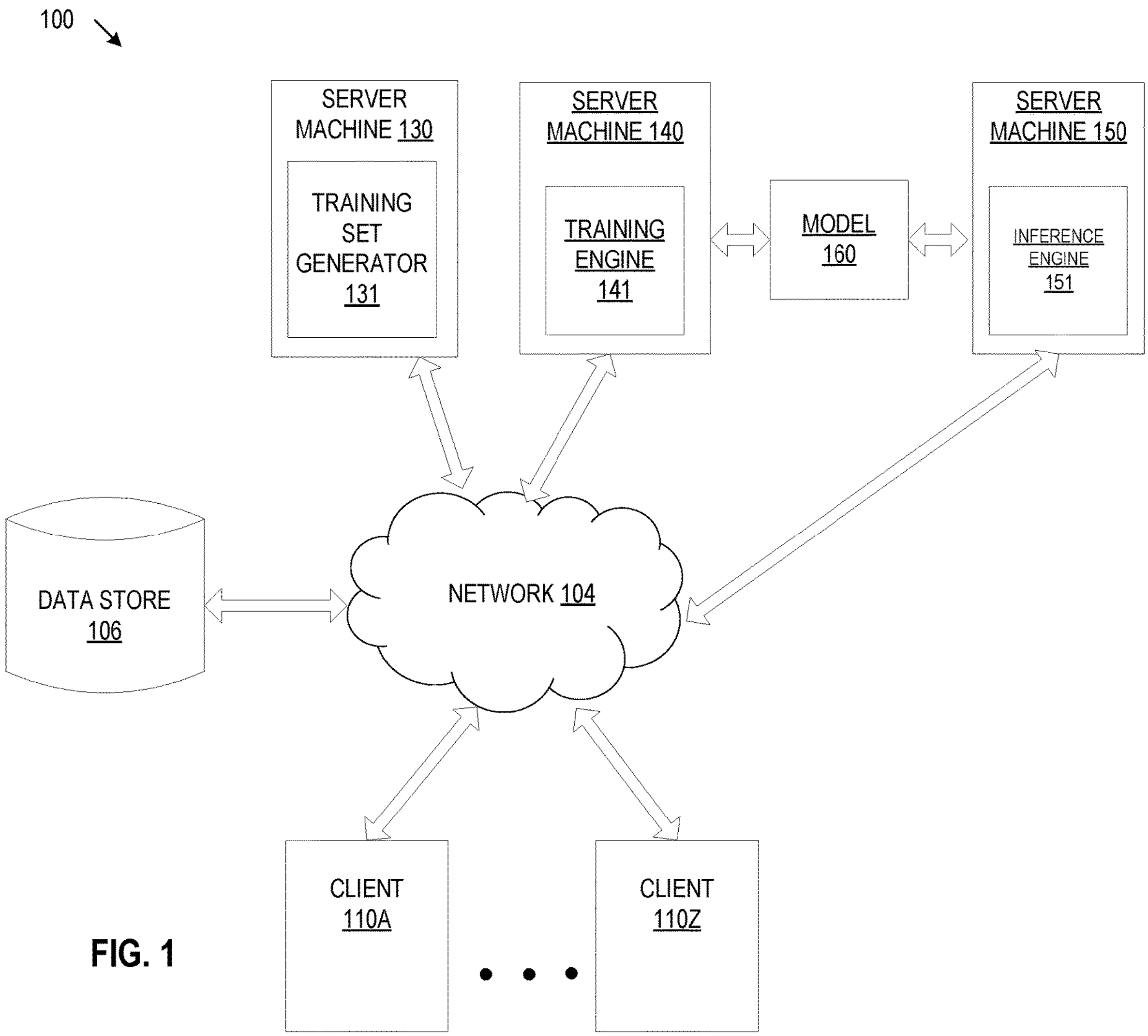
FIG. 1 illustrates an example system architecture, in accordance with at least one embodiment of the present disclosure.

Aspects of the present disclosure relate to using machine learning and discrete tokens to estimate (e.g., identify) different sound sources from audio mixtures. The need to separate individual sound sources (e.g., speech sources) from complex audio mixtures (e.g., mixed audio signals that contain multiple overlapping sources) has become increasingly important. A sound source can refer to the origin or point of generation of a sound wave or audio signal. When sound waves are captured by, for example, a microphone, they are converted into electrical signals that represent the original sound. These electrical signals, often referred to as audio signals, can then be processed, stored, transmitted, or reproduced by audio devices and systems.

In environments with multiple speakers or overlapping sounds, separating individual speech sources can significantly improve speech intelligibility. It can enhance the clarity and understandability of speech, benefiting applications such as voice communication, voice assistants, and transcription services. Further, separating different sound sources from complex audio mixtures can enhance audio quality by isolating and preserving the desired sound while reducing unwanted noise, background interference, or reverberation. This is beneficial in various areas, including audio recordings. Further, sound separation can be crucial for improving communication systems, particularly in noisy environments or during teleconferencing, where separating the desired speech source from background noise and interference is essential for effective communication and comprehension among participants or speakers.

Conventional audio systems often struggle to isolate and enhance audio signals. Conventional sound separation techniques typically use single-channel separation models (e.g., speech separation models), which involve training deep neural networks on time-domain or frequency-domain continuous-space inputs, such as by using an artificial mixture of isolated speech as training input to estimate individual sound sources by predicting continuous variables (e.g., spectrogram representations) with regression-based methods. However, these techniques have limitations in terms of accuracy, robustness, and computational complexity. In particular, these single-channel separation models often struggle to accurately separate individual sound sources and may introduce artifacts or distortions in the process that impact perceptual quality. Distortions can refer to any undesired alteration or modification of the original sound waveform, such as the introduction of additional frequencies, amplitude changes, nonlinearities, or other forms of signal degradation. Artifacts can refer to unintended or unwanted perceptual anomalies of audio data, such as audible imperfections, noise, glitches, tonal changes, spatial irregularities, or other perceptual discrepancies that deviate from the original audio content.

Aspects of the present disclosure address the above and other deficiencies by training a machine learning model to identify different sound sources from mixed audio signals provided by, for example, a client device and additional audio source-identifying data. In some implementations, the machine learning model can be trained using training input data that includes the mixed audio signals (e.g., a set of mixed audio recordings) that is converted into sequences of discrete tokens, and target output that identifies an individual sound source for a subset of discrete tokens of the sequences of discrete tokens. In some implementations, once the machine learning model is trained, it can be used to identify (e.g., separate) different sound sources from the mixed audio signals provided by the client device. In some implementations, the machine learning model can also be used to provide a transcript of each sound source.

Discrete tokens can refer to units of information derived from audio signals. Each discrete token represents an element within an audio signal. In some implementations, each discrete token can represent a separate and self-contained element within an audio signal. In some implementations, each discrete token can represent a different attribute of the audio signal, such that the entire sequence of tokens represents the entire audio signal. Tokenization can be used to process audio signals into discrete tokens. The tokenization process involves segmenting an audio signal into distinct units (e.g., determining a sequence of discrete tokens that represents the audio signal, such that a perceptually similar facsimile of the audio signal can be generated from the tokens, or such that perceptually relevant attributes of the audio signal can be identified from the tokens). One example of a type of discrete token is a semantic token. Semantic tokens can refer to discrete units of information derived from text data extracted from the audio signals that capture not only the individual words or subword units but also their associated meanings and contextual representations. For example, semantic tokens can include information such as part-of-speech tags (e.g., "NN" for noun, "VB" for verb, "JJ" for adjective, "RB" for adverb, "PRP" for pronoun, "IN" for preposition, etc.), named entity labels (e.g., "PER" for person, "ORG" for organization, "LOC" for location, "TIME" for time, etc.), or syntactic dependencies (e.g., subject-verb, direct object, indirect object, modifier, conjunction, etc.). The use of semantic tokens enables a more nuanced and comprehensive understanding of the text data extracted from the audio signals. In other examples, semantic tokens can be quantized embeddings that can implicitly include the aforementioned information (e.g., part-of-speech tags, named entity labels, syntactic dependencies, etc.). Another example of a type of discrete token is an acoustic token. Acoustic tokens can refer to discrete units of acoustic information derived from the audio signals. Acoustic tokens capture specific sound events (e.g., dog barks, laughter, sirens, phone ringing, music notes, etc.) or acoustic characteristics (e.g., amplitude, frequency, duration, etc.) within the audio signals.

As discussed above, in some implementations, the training input data for the machine learning model can include the mixed audio signals, which can comprise a set of mixed audio recordings. The set of mixed audio recordings can be converted into sequences of discrete tokens. The set of mixed audio recordings can be recordings of audio (e.g., audiobooks) that are split into different portions of a fixed (e.g., predefined) length (e.g., 3 seconds). The portions of mixed audio recordings can be converted into sequences of discrete tokens using, for example, one or more additional machine learning models. For example, the additional machine learning models can include a self-supervised (SSL) machine learning model that can provide an output that identifies a sequence of discrete tokens of a particular type, such as semantic tokens. An SSL machine learning model can refer to a model that learns from unlabeled data by formulating and solving pretext tasks, such as predicting missing parts of data or contextually filling gaps. Unlike supervised learning models that rely on explicitly labeled data, self-supervised learning models leverage inherent patterns and structures within the unlabeled data to construct meaningful representations or features that capture the underlying information present in the data. In another example, the additional machine learning models can include a neural codec machine learning model that can provide an output that identifies a sequence of discrete tokens of another particular type, such as acoustic tokens. A neural codec machine learning model can refer to a model that utilizes neural networks to perform efficient and optimized coding and decoding of data. Neural codec models employ neural networks, such as autoencoders or variational autoencoders, to encode input data into a compressed representation, often referred to as a latent space or code. This compressed representation preserves the essential information of the input data while reducing its size. The neural codec model also includes a decoding component that reconstructs the original data from the compressed representation.

Once the machine learning model is trained, it can be used to identify (e.g., separate) different sound sources from the mixed audio signals provided by the client device. For example, audio input that includes the mixed audio signals can be provided by a client device. The audio input can be converted into a set of discrete tokens using the one or more additional machine learning models described above. The set of discrete tokens can be provided as input to the trained machine learning model. An output can then be obtained from the trained machine learning model, where the output indicates a set of sound sources. Each sound source of the set of sound sources can correspond to a subset of discrete tokens of the set of discrete tokens. In some implementations, the trained machine learning model can also be used to provide a transcript of each sound source.

Accordingly, aspects of the present disclosure can provide improved accuracy when identifying different sound sources from audio mixtures. By using discrete tokens during the training of a machine learning model and during the inference phase instead of using time-domain or frequency-domain continuous-space inputs of conventional techniques, individual sound sources can be more accurately identified from audio mixtures. Further, by converting the audio mixtures into different types of discrete tokens (e.g., acoustic tokens and/or semantic tokens) using additional machine learning models, the audio quality of each individual sound source can be improved by reducing the artifacts or distortions that can arise during the process. Further, by using additional audio source-identifying data, such as transcripts, audio descriptions, or captions of each sound source, as inputs into the machine learning model, the accuracy in identifying each individual sound source can further be improved.

FIG. 1 illustrates an example system architecture 100, in accordance with at least one embodiment. The system architecture 100 (also referred to as "system" herein) includes one or more server machines 130 through 150, a data store 106, and client devices 110A-110Z connected to a network 104.

In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In implementations, data store 106 is a persistent storage that is capable of storing audio data, including discrete tokens, and training data for machine learning model 160, as well as data structures to tag, organize, and index such data. Data store 106 may be hosted by one or more storage devices, such as main memory, magnetic or optical storage based disks, tapes or hard drives, NAS, SAN, and so forth. In some implementations, data store 106 may be a network-attached file server, while in other embodiments data store 106 may be some other type of persistent storage such as an object-oriented database, a relational database, and so forth, that may be hosted by one or more different machines coupled to the servers 130-150 via the network 104, including a video conference platform (not illustrated).

In some implementations, the data store 106 can store portions of audio input received from the client devices 110A-110Z, such as portions of audio input received from the client devices 110A-110Z for a video conference platform. A video conference platform can enable users of client devices 110A-110Z to connect with each other via a video conference. A video conference refers to a real-time communication session such as a video conference call, also known as a video-based call or video chat, in which participants can connect with multiple additional participants in real-time and be provided with audio and video capabilities. Real-time communication refers to the ability for users to communicate (e.g., exchange information) instantly without transmission delays and/or with negligible (e.g., milliseconds or microseconds) latency. The video conference platform can allow a user to join and participate in a video conference call with other users of the platform. Embodiments of the present disclosure can be implemented with any number of participants connecting via the video conference (e.g., up to one hundred or more). In some embodiments, the video conference platform is coupled, via network 104, with one or more client devices that are each associated with a physical conference or meeting room.

The client devices 110A-110Z may each include computing devices such as personal computers (PCs), laptops, mobile phones, smart phones, tablet computers, netbook computers, network-connected televisions, etc. In some implementations, client devices 110A through 110Z may also be referred to as "user devices." In some implementations, each client device 110A-110Z can include an audiovisual component that can generate audio and/or video data (e.g., to stream to a video conference platform). In some implementations, the audiovisual component can include a device (e.g., a microphone) to capture an audio signal representing speech of a user and generate audio data (e.g., an audio file or audio stream) based on the captured audio signal. The audiovisual component can include another device (e.g., a speaker) to output audio data to a user associated with a particular client device 110A-110Z. In some implementations, each client device includes a media viewer. In one implementation, the media viewers may be applications that allow users to playback, view, or upload content, such as images, video items, web pages, documents, audio items, etc. For example, the media viewer may be a web browser that can access, retrieve, present, or navigate content (e.g., web pages such as Hyper Text Markup Language (HTML) pages, digital media items, etc.) served by a web server. The media viewer may render, display, or present the content (e.g., a web page, a media viewer) to a user. The media viewer may also include an embedded media player (e.g., a Flash® player or an HTML5 player) that is embedded in a web page (e.g., a web page that may provide information about a product sold by an online merchant). In another example, the media viewer may be a standalone application (e.g., a mobile application, or native application) that allows users to playback digital media items (e.g., digital video items, digital images, electronic books, etc.), or participate in a conferencing meeting (e.g., a video or audio conference meeting).

In one implementation, the server machines 130-150 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user."

Server machine 130 includes a training set generator 131 that is capable of generating training data (e.g., a set of training inputs and a set of target outputs) to train a machine learning model. Some operations of training set generator 131 are described in detail below with respect to FIG. 2.

Server machine 140 includes a training engine 141 that is capable of training a machine learning model 160 using the training data from training set generator 131. The machine learning model 160 may refer to a model artifact that is created by the training engine 141 using the training data that includes training inputs and corresponding target outputs (correct answers for respective training inputs). The training engine 141 may find patterns in the training data that map the training input to the target output (the answer to be predicted), and provide the machine learning model 160 that captures these patterns. The machine learning model 160 may be composed of, e.g., a single level of linear or non-linear operations (e.g., a support vector machine [SVM]) or may be a deep network, i.e., a machine learning model that is composed of multiple levels of non-linear operations. An example of a deep network is a neural network with one or more hidden layers, and such machine learning model may be trained by, for example, adjusting weights of a neural network in accordance with a backpropagation learning algorithm or the like. For convenience, the remainder of this disclosure will refer to the implementation as a neural network, even though some implementations might employ an SVM or other type of learning machine instead of, or in addition to, a neural network. In some embodiments, the machine learning model 160 can be a transformer-based sequence-to-sequence encoder-decoder model.

In one aspect, the training set is obtained from server machine 130. Server machine 150 includes a training engine 151 that provides data (e.g., audio data, such as discrete tokens as described herein) as input to trained machine learning model 160 and runs trained machine learning model 160 on the input to obtain one or more outputs.

In implementations, the trained machine learning model 160 may produce an output that identifies a subset of discrete tokens corresponding to a portion of mixed audio signals from an audio recording, and an identifier of a sound source for the particular subset of discrete tokens.

Once the machine learning model is trained, the trained machine learning model 160 can be used to provide an output identifying a subset of discrete tokens corresponding to a portion of mixed audio signals from an audio recording, and an identifier of a sound source for the particular subset of discrete tokens.

It should be noted that in some other implementations, the functions of server machines 130, 140, and 150 may be provided by a fewer number of machines. For example, in some implementations server machines 130 and 140 may be integrated into a single machine, while in some other implementations server machines 130, 140, and 150 may be integrated into a single machine.

In general, functions described in one implementation as being performed by the server machine 130, server machine 140, or server machine 150 can also be performed on the client devices 110A through 110Z in other implementations, if appropriate. In addition, the functionality attributed to a particular component can be performed by different or multiple components operating together. The server machine 130, server machine 140, or server machine 150 can also be accessed as a service provided to other systems or devices through appropriate application programming interfaces, and thus is not limited to use in websites.

In situations in which the systems discussed here collect personal information about users, or may make use of personal information, the users may be provided with an opportunity to control whether the server machines 130-150 collect user information (e.g., information about a user's social network, social actions or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the server machines 130-150.

Figure 2:
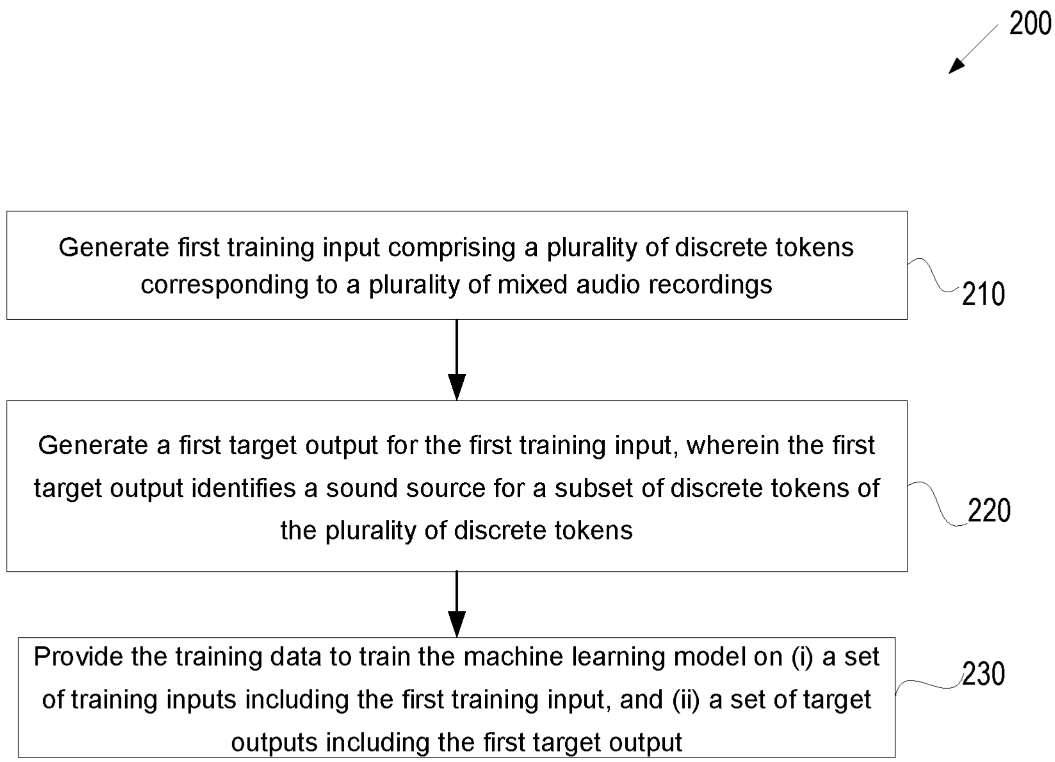
FIG. 2 illustrates a flow diagram of an example method for training a machine learning model, in accordance with at least one embodiment.

FIG. 2 illustrates a flow diagram of an example method for training a machine learning model, in accordance with at least one embodiment. Method 200 may be performed by processing logic that may include hardware (circuitry, dedicated logic, etc.), software (e.g., instructions run on a processing device), or a combination thereof. In some embodiments, some or all operations of method 200 may be included in server machines 130-150 of FIG. 1. In some embodiments, one or more blocks of method 200 may be external to the server machines 130-150. Examples of hardware and software components that may be used to implement method 200 are described with respect to FIG. 1. In some embodiments, one or more of the depicted blocks of method 200 may be presented in a different order or omitted. In some embodiments, additional blocks not depicted in FIG. 2 may be present (e.g., additional intermediate processing blocks).

Referring to FIG. 2, at block 210, processing logic generates training input (e.g., first training input) for the machine learning model. In some embodiments, the machine learning model can be a transformer-based sequence-to-sequence encoder-decoder model. The training input can include a set (e.g., a sequence) of discrete tokens. As discussed above, discrete tokens refer to distinct units of information derived from audio signals (e.g., a set of mixed audio recordings). Each discrete token represents a separate and self-contained element within the audio signal. One example of a type of discrete token is a semantic token. Semantic tokens can refer to discrete units of information derived from text data extracted from the audio signals that capture not only the individual words or subword units but also their associated meanings and contextual representations. For example, semantic tokens can include information such as part-of-speech tags (e.g., "NN" for noun, "VB" for verb, "JJ" for adjective, "RB" for adverb, "PRP" for pronoun, "IN" for preposition, etc.), named entity labels (e.g., "PER" for person, "ORG" for organization, "LOC" for location, "TIME" for time, etc.), or syntactic dependencies (e.g., subject-verb, direct object, indirect object, modifier, conjunction, etc.). Another example of a type of discrete token is an acoustic token. Acoustic tokens can refer to discrete units of acoustic information derived from audio signals. Acoustic tokens capture specific sound events (e.g., dog barks, laughter, sirens, phone ringing, etc.) or acoustic characteristics (e.g., amplitude, frequency, duration, etc.) within the audio data.

In some embodiments, the set of discrete tokens can be generated from a set of mixed audio recordings. In some implementations, the set of mixed audio recordings can be recordings of audio (e.g., audiobooks). In some embodiments, generating the set of discrete tokens used as training input can include splitting the set of mixed audio recordings into a set of portions. Each portion can have a predefined (e.g., fixed) length of time. For example, the predefined length of time can be a fixed number of seconds, such as 3 seconds. In some embodiments, each set of portions can be provided as input to an additional machine learning model, such as a self-supervised learning (SSL) machine learning model. An SSL machine learning model refers to a model that learns from unlabeled data by formulating and solving pretext tasks, such as predicting missing parts of data or contextually filling gaps. The SSL machine learning model can be stored, for example, at one or more of the server machines 130-150. The processing logic can obtain, from the SSL machine learning model, one or more outputs that identify the set of discrete tokens, where the set of discrete tokens is a set of semantic tokens. In some implementations, to output the set of discrete tokens, the SSL machine learning model can extract the text data from the inputted set of portions of mixed audio recordings. Extracting the text data can include extracting, using vector quantization, vector embeddings from audio waveforms of the set of portions of mixed audio recordings. In response to extracting the vector embeddings, the vector embeddings can be discretized (e.g., to obtain the set of discrete tokens) using a k-means clustering method, where each set of portion of mixed audio recordings is mapped to a corresponding vector embedding. In some embodiments, each set of portions can be provided as input to another additional machine learning model, such as a neural audio codec machine learning model. The processing logic can obtain, from the neural audio codec machine learning model, one or more outputs that identify the set of discrete tokens, where the set of discrete tokens is a set of acoustic tokens. A neural codec machine learning model refers to a model that utilizes neural networks to perform efficient and optimized coding and decoding of data. Neural codec models employ neural networks, such as autoencoders or variational autoencoders, to encode input data into a compressed representation, often referred to as a latent space or code. This compressed representation preserves the essential information of the input data while reducing its size. The neural codec model also includes a decoding component that reconstructs the original data from the compressed representation. The neural codec model can be stored, for example, at one or more of the server machines 130-150.

In some embodiments, in response to obtaining the set of discrete tokens as output from the one or more additional machine learning model(s), the processing logic can apply one or more predefined masking patterns to each type of discrete token. A masking pattern can refer to a technique where specific tokens in a sequence of discrete tokens are masked or replaced with a special token. For example, the special token can be denoted as "[MASK]." As an example, in the sentence, "This is a patent," a masking pattern can be applied to replace "patent" with a special token: "This is a [MASK]," where [MASK] represents the masked token. The masking pattern can allow the one or more additional machine learning model(s) to predict the masked token based on the context and surrounding words and/or tokens in the sequence of discrete tokens. In some embodiments, the processing logic can apply a first predefined masking pattern to each set of acoustic tokens. For example, the first predefined masking pattern can be a particular special token that is used to mask or replace acoustic tokens, such as "[MASK-ACOUSTIC]." The processing logic can apply a second predefined masking pattern to each set of semantic tokens. For example, the second predefined masking pattern can be another particular special token that is used to mask or replace certain (e.g., pseudo-random) semantic tokens, such as "[MASK-SEMANTIC]." In some implementations, the pseudo-random semantic tokens can be identified using a random generator method. In some embodiments, each predefined masking pattern can be applied based on a probability distribution function, where each type of discrete token has a different probability for being applied with a predefined masking pattern. For example, a predefined masking pattern can be applied to mask a set of acoustic tokens 30% of the time, a predefined masking pattern can be applied to mask a set of semantic tokens 20% of the time, and/or a predefined masking pattern can be applied to mask a set of transcript tokens 10% of the time. In some embodiments, each predefined masking pattern can be stored on one or more of the server machines 130-150. By applying different masking patterns (e.g., by masking different combinations of tokens in a sequence of discrete tokens) during training, the machine learning model can be trained to perform multiple tasks. For example, applying a masking pattern to mask a transcript for use as a training input to the machine learning model and using an output set of acoustic tokens as a target output, the machine learning model can be trained to perform speech separation. In another example, applying a masking pattern to mask a set of acoustic tokens and a set of semantic tokens for use as a training input to the machine learning model and using an output set of acoustic tokens as a target output, the machine learning model can be trained to perform text-to-speech synthesis. In another example, applying a masking pattern to mask a transcript for use as a training input and using a set of transcript tokens as a target output, the machine learning model can be trained to perform automatic speech recognition of a set of (e.g., multiple) speakers.

At block 220, processing logic generates a target output (e.g., a first target output) for the training input. In some embodiments, the target output identifies a sound source for a subset of discrete tokens of the set of discrete tokens. For example, using FIG. 3B as an illustrative example, the target output can be an identifier of a sound source (e.g., speaker 1, speaker 2) for a subset of discrete tokens (e.g., acoustic tokens 321, acoustic tokens 323, semantic tokens 325, semantic tokens 327). In some embodiments, the processing logic can generate a target output for the training input that identifies a transcript for each sound source. For example, as illustrated in FIG. 3B, the target output can include a transcript 329 identified for speaker 1 and a transcript 331 identified for speaker 2.

At block 230, processing logic provides the training data to train the machine learning model on (i) a set of training inputs including the training input generates at block 210, and (ii) a set of target outputs including the target output generated at block 220. In the case of a neural network, for example, input values of a given input/output mapping (e.g., numerical values associated with training inputs generated at block 210) are input to the neural network, and output values (e.g., numerical values associated with target outputs generated at block 220) of the input/output mapping are stored in the output nodes of the neural network. The connection weights in the neural network are then adjusted in accordance with a learning algorithm (e.g., backpropagation, etc.), and the procedure is repeated for the other input/output mappings in training set T. After block 230, machine learning model 160 can be trained using training engine 141 of server machine 140. The trained machine learning model 160 can be implemented by inference engine 151 (of server machine 150) to estimate (e.g., identify) different sound sources from mixed audio signals.

Figure 3A:
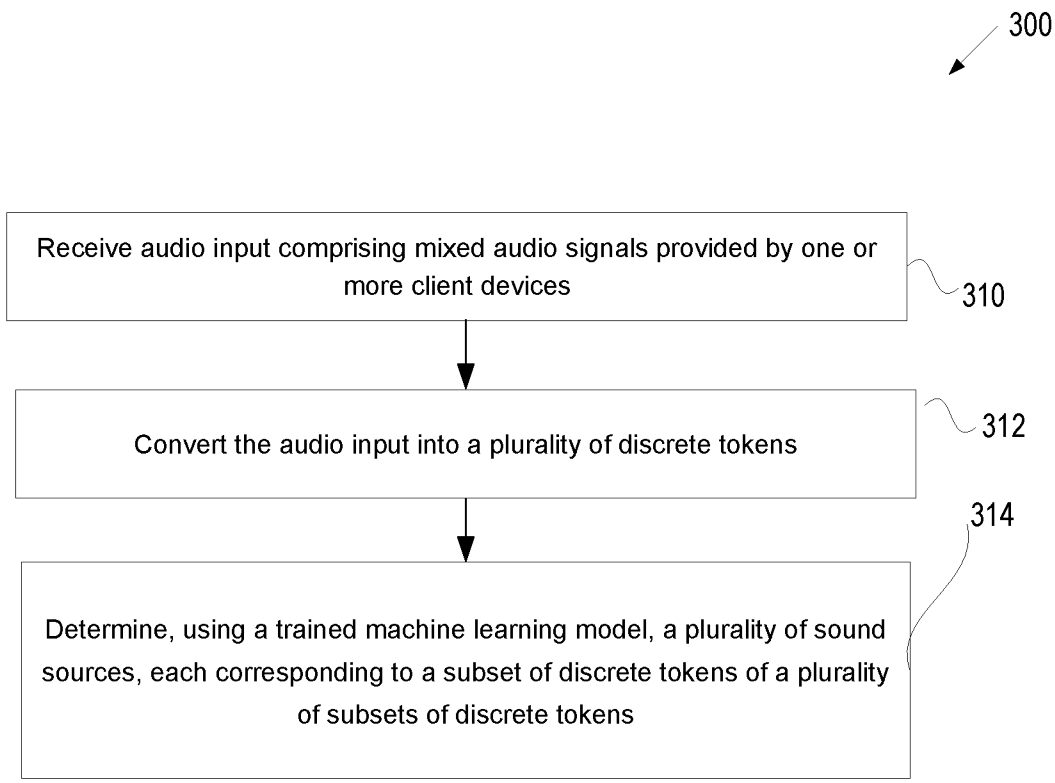
FIG. 3A illustrates a flow diagram of an example method for using machine learning and discrete tokens to estimate different sound sources from audio mixtures, in accordance with at least one embodiment.

FIG. 3A illustrates a flow diagram of an example method 300 for using machine learning and discrete tokens to estimate (e.g., identify) different sound sources from audio mixtures, in accordance with at least one embodiment.

Figure 3B:
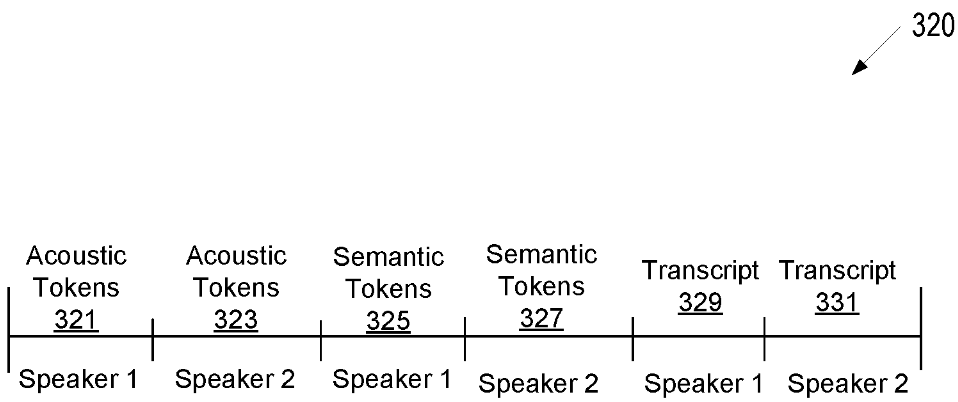
FIG. 3B illustrates an example output obtained from a machine learning model identifying a sound source for a subset of discrete tokens of a plurality of discrete tokens, in accordance with at least one embodiment.

FIG. 3B illustrates an example output obtained from a machine learning model identifying a sound source for a subset of discrete tokens of a plurality of discrete tokens, in accordance with at least one embodiment.

Referring to FIG. 3A, method 300 may be performed by processing logic that may include hardware (circuitry, dedicated logic, etc.), software (e.g., instructions run on a processing device), or a combination thereof. In some embodiments, some or all operations of method 300 may be included in server machines 130-150 of FIG. 1. In some embodiments, one or more blocks of method 300 may be external to the server machines 130-150. Examples of hardware and software components that may be used to implement method 300 are described with respect to FIG. 1. In some embodiments, one or more of the depicted blocks of method 300 may be presented in a different order or omitted. In some embodiments, additional blocks not depicted in FIG. 3A may be present (e.g., additional intermediate processing blocks).

Referring to FIG. 3A, at block 310, processing logic receives audio input including mixed audio signals provided by one or more client devices (e.g., from a microphone of one or more of the client devices 110A-110Z of FIG. 1).

At block 312, the processing logic converts the audio input into a set (e.g., a sequence) of discrete tokens. As described above, discrete tokens refer to distinct units of information derived from audio signals (e.g., a set of mixed audio recordings). One example of a type of discrete token is a semantic token. Semantic tokens can refer to discrete units of information derived from text data extracted from audio signals that capture not only the individual words or subword units but also their associated meanings and contextual representations. Another example of a type of discrete token is an acoustic token. Acoustic tokens can refer to discrete units of acoustic information derived from audio signals. Acoustic tokens capture specific sound events (e.g., dog barks, laughter, sirens, phone ringing, etc.) or acoustic characteristics (e.g., amplitude, frequency, duration, etc.) within the audio data.

In some embodiments, converting the mixed audio signals into the set of discrete tokens can include providing input including the mixed audio signals to an additional (e.g., second) machine learning model, such as a self-supervised learning (SSL) machine learning model. An SSL machine learning model refers to a model that learns from unlabeled data by formulating and solving pretext tasks, such as predicting missing parts of data or contextually filling gaps. The SSL machine learning model can be stored, for example, at one or more of the server machines 130-150. The processing logic can obtain, from the SSL machine learning model, one or more outputs that identify the set of discrete tokens, where the set of discrete tokens is a set of semantic tokens. In some implementations, to output the set of discrete tokens, the SSL machine learning model can extract the text data from the inputted set of portions of mixed audio recordings. Extracting the text data can include extracting, using vector quantization, vector embeddings from audio waveforms of the set of portions of mixed audio recordings. In response to extracting the vector embeddings, the vector embeddings can be discretized (e.g., to obtain the set of discrete tokens) using a k-means clustering method, where each set of portion of mixed audio recordings is mapped to a corresponding vector embedding. In some embodiments, converting the mixed audio signals into the set of discrete tokens can include providing input including the mixed audio signals to another additional (e.g., second or third) machine learning model, such as a neural audio codec machine learning model. The processing logic can obtain, from the neural audio codec machine learning model, one or more outputs that identify the set of discrete tokens, where the set of discrete tokens is a set of acoustic tokens. The neural audio codec machine learning model can employ neural networks, such as autoencoders or variational autoencoders, to encode the input (e.g., the mixed audio signals) into a compressed representation, often referred to as a latent space or code. This compressed representation preserves the essential information of the input while reducing its size. The neural audio codec machine learning model also includes a decoding component that reconstructs the original input from the compressed representation. The neural audio codec machine learning model can be stored, for example, at one or more of the server machines 130-150.

At block 314, processing logic determines, using a trained machine learning model (e.g., the machine learning model trained in accordance with the example method described with respect to FIG. 2) and/or a transformer-based sequence-to-sequence encoder-decoder model), a set of sound sources that each correspond to a subset of discrete tokens of a set of subsets of discrete tokens. In some embodiments, the processing logic can provide, as input to the trained machine learning model, the set of discrete tokens. In some embodiments, the set of discrete tokens can be a set of acoustic tokens. In some embodiments, the processing logic can provide another input (e.g., a second input) to the trained machine learning model that includes another set of discrete tokens, such as semantic tokens. In some embodiments, the processing logic can provide another input (e.g., a second or third input) to the trained machine learning model that includes at least one or more of: one or more transcripts that transcribe speech from the mixed audio signals, one or more audio descriptions of the mixed audio signals, one or more class identities of the mixed audio signals, and/or one or more captions for the mixed audio signals. In some implementations, the one or more transcripts and one or more captions can be stored on the server machines 130-150 and can be generated using automatic speech recognition models. In some implementations, the one or more audio descriptions can refer to descriptions of the content and/or characteristics of the mixed audio signals. For example, the one or more audio descriptions can be descriptions of sound events or other audio elements in the mixed audio signals (such as musical notes, dog barking, etc.). The one or more audio descriptions can be stored on the server machines 130-150. In some implementations, the one or more class identities can refer to the categorization or labeling or different sound events into specific classes or categories that can provide information about the type, nature, or characteristic of an audio signal of the mixed audio signals. For example, the one or more class identities can refer to categories such as environmental sounds (e.g., rain, thunder), musical instruments (e.g., piano, violin), speech (e.g., child speech, female speech), language (e.g., English, Spanish), animal sounds (e.g., dog barking, bird chirping), etc. The one or more class identities can be stored on the server machines 130-150. In some implementations, the processing logic can provide input to another (e.g., second or third) trained machine learning model, where the input includes a set of waveforms that correspond to the audio input, as described in detail with respect to FIG. 4.

In some implementations, the processing logic obtains, from the trained machine learning model, one or more outputs that identifies (i) the set of subsets of discrete tokens of the set of tokens, and (ii) a set of identifiers of the set of sound sources. Each identifier can identify a sound source for a subset of discrete tokens. For example, using FIG. 3B as an illustrative example, the one or more outputs can include an identifier of a sound source (e.g., speaker 1, speaker 2) for a subset of discrete tokens (e.g., acoustic tokens 321, acoustic tokens 323, semantic tokens 325, semantic tokens 327). In some embodiments, the processing logic can generate an output that identifies a transcript for each sound source. For example, as illustrated in FIG. 3B, the output can include a transcript 329 identified for speaker 1 and a transcript 331 identified for speaker 2.

Figure 4:
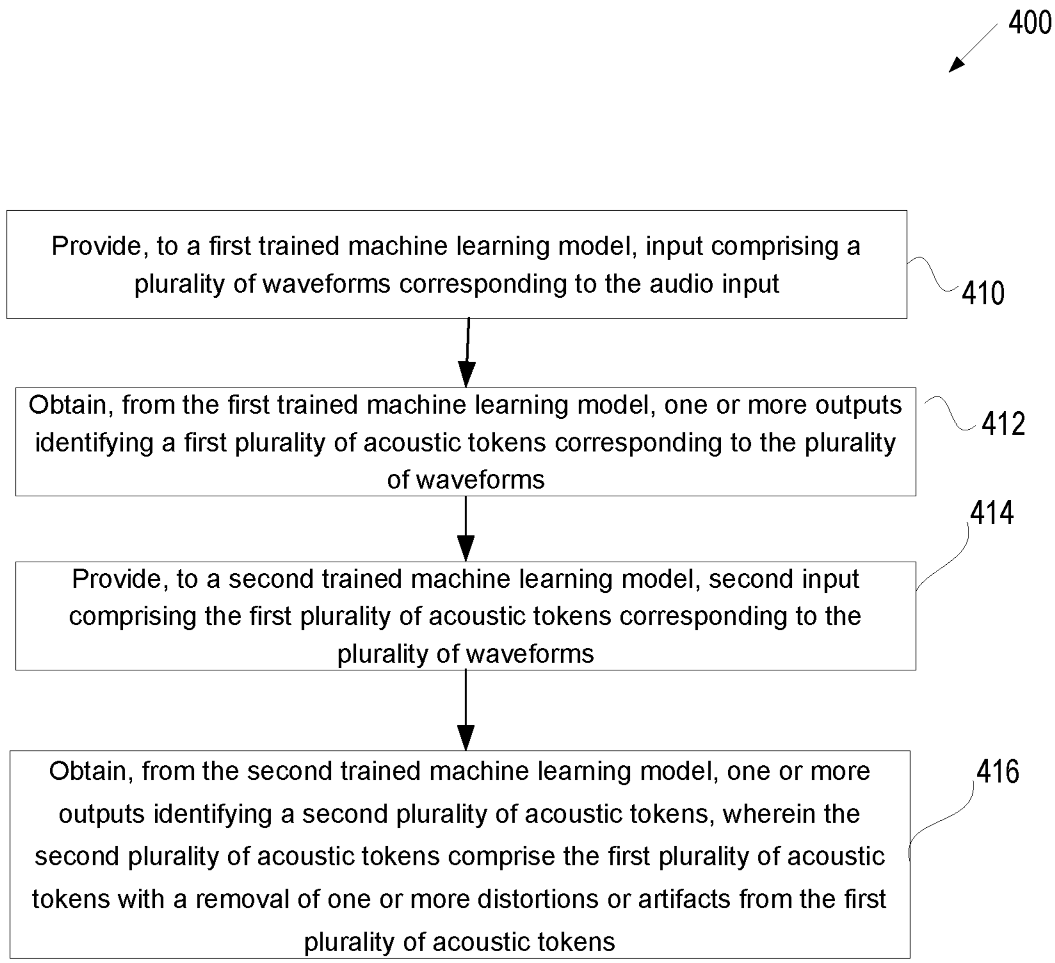
FIG. 4 illustrates a flow diagram of an example method for using machine learning and discrete tokens to estimate different sound sources from audio mixtures, in accordance with at least one embodiment.

FIG. 4 illustrates a flow diagram of an example method for using machine learning and discrete tokens to estimate (e.g., identify) different sound sources from audio mixtures, in accordance with at least one embodiment. Method 400 may be performed by processing logic that may include hardware (circuitry, dedicated logic, etc.), software (e.g., instructions run on a processing device), or a combination thereof. In some embodiments, some or all operations of method 400 may be included in server machines 130-150 of FIG. 1. In some embodiments, one or more blocks of method 400 may be external to the server machines 130-150. Examples of hardware and software components that may be used to implement method 400 are described with respect to FIG. 1. In some embodiments, one or more of the depicted blocks of method 400 may be presented in a different order or omitted. In some embodiments, additional blocks not depicted in FIG. 4 may be present (e.g., additional intermediate processing blocks).

Referring to FIG. 4, at block 410, processing logic provides, to a trained machine learning model (e.g., a first trained machine learning model), input that includes a set of waveforms. The set of waveforms can correspond to an audio input (e.g., the set of waveforms can represent a particular sound source of a set of sound sources from mixed audio signals). The mixed audio signals can be received from one or more client devices (e.g., from a microphone of one or more of the client devices 110A-110Z of FIG. 1). The set of waveforms can be generated using an additional (e.g., a second) machine learning model, such as a time-domain convolutional neural network, and can be stored at one or more of the server machines 130-150. The first trained machine learning model can be a self-supervised learning (SSL) machine learning model or a neural audio codec machine learning model, as described above. The processing logic can obtain, from the SSL machine learning model, one or more outputs that identify the set of discrete tokens, where the set of discrete tokens is a set of semantic tokens. The SSL machine learning model can be stored, for example, at one or more of the server machines 130-150. The processing logic can obtain, from the neural audio codec machine learning model, one or more outputs that identify the set of discrete tokens, where the set of discrete tokens is a set of acoustic tokens. The neural codec model can be stored, for example, at one or more of the server machines 130-150.

At block 412, processing logic obtains, from the first trained machine learning model, one or more outputs that identify a first set of discrete tokens (e.g., acoustic tokens and/or semantic tokens) that correspond to the set of waveforms. Discrete tokens refer to distinct units of information derived from text data (e.g., text data of audio mixtures, such as a set of mixed audio recordings). Each discrete token represents a separate and self-contained element within the text, typically corresponding to words, phrases, or subword units, as described herein with respect to FIGS. 2-3A.

At block 414, processing logic provides, to another trained machine learning model (e.g., a second trained machine learning model), another input (e.g., a second input) that includes the set of discrete tokens obtained at block 412 corresponding to the set of waveforms. In some embodiments, the second trained machine learning model can be the machine learning model described with respect to FIG. 2 and FIG. 3A. In some embodiments, the second trained machine learning model can be a transformer-based sequence-to-sequence encoder-decoder model.

At block 416, processing logic obtains, from the second trained machine learning model, one or more outputs that identify (i) a second set of discrete tokens (e.g., acoustic tokens and/or semantic tokens). In some embodiments, the second set of discrete tokens can include the first set of discrete tokens with one or more distortions and/or artifacts from the first set of discrete tokens removed. Distortions can refer to any undesired alteration or modification of the original sound waveform, such as the introduction of additional frequencies, amplitude changes, nonlinearities, or other forms of signal degradation. Artifacts can refer to unintended or unwanted perceptual anomalies of audio data, such as audible imperfections, noise, glitches, tonal changes, spatial irregularities, or other perceptual discrepancies that deviate from the original audio content.

Figure 5:
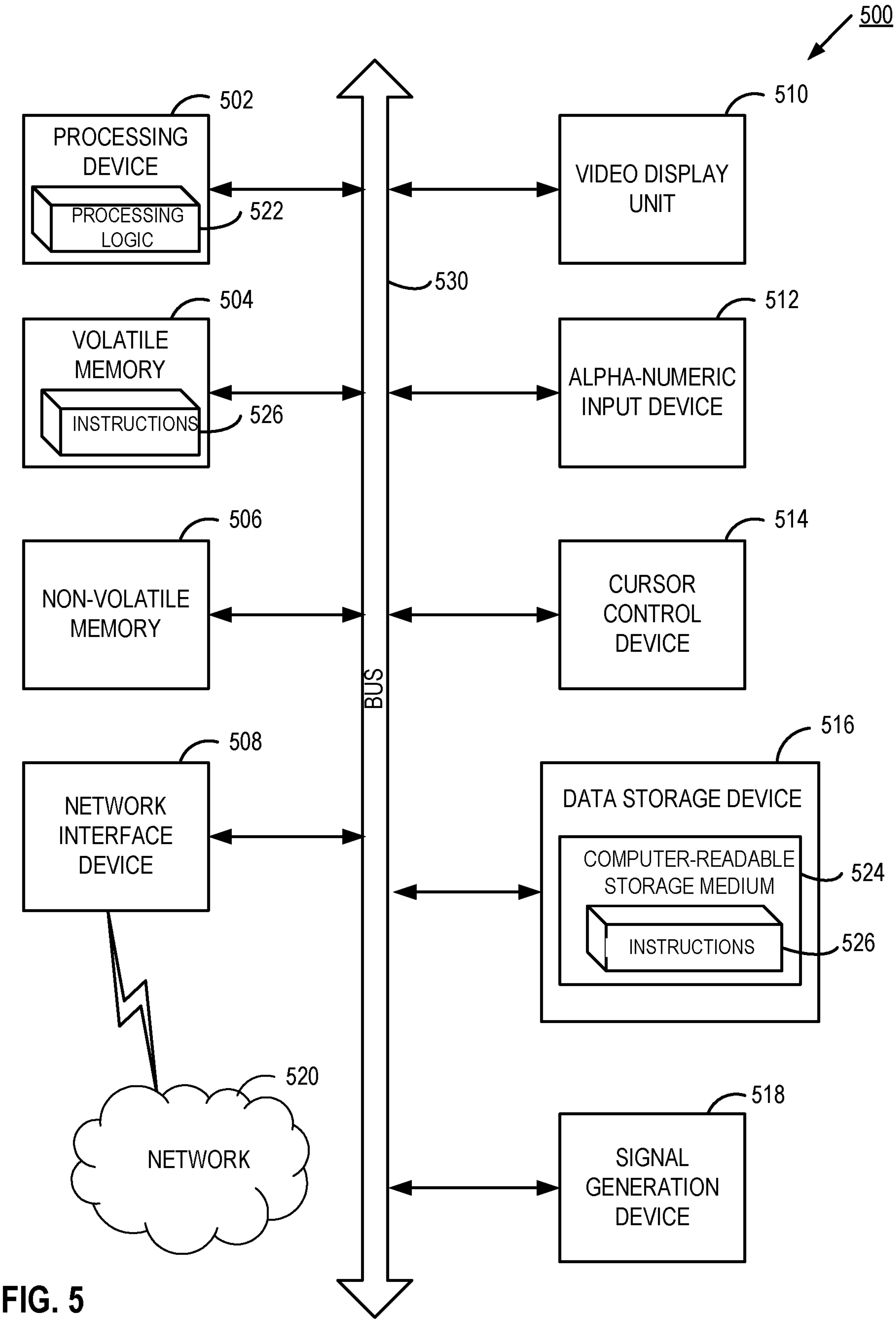
FIG. 5 is a block diagram illustrating an exemplary computer system, in accordance with at least one embodiment of the present disclosure.

FIG. 5 is a block diagram illustrating an exemplary computer system 500, in accordance with implementations of the present disclosure. The computer system 500 can correspond to server machines 130-150, and/or client devices 110A-110Z, as described with respect to FIG. 1. Computer system 500 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 540.

Processor (processing device) 502 represents one or more general-purpose processing devices such as a microprocessor, central processing unit, or the like. More particularly, the processor 502 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 can also be one or more special-purpose processing devices such as an application specific integrated circuit (ASIC), a field programmable gate array (FPGA), a digital signal processor (DSP), network processor, or the like. The processor 502 is configured to execute instructions 505 (e.g., for using machine learning to estimate (e.g., identify) different sound sources from audio mixtures) for performing the operations discussed herein.

The computer system 500 can further include a network interface device 508. The computer system 500 also can include a video display unit 510 (e.g., a liquid crystal display (LCD) or a cathode ray tube (CRT)), an input device 512 (e.g., a keyboard, and alphanumeric keyboard, a motion sensing input device, touch screen), a cursor control device 514 (e.g., a mouse), and a signal generation device 520 (e.g., a speaker). In some embodiments, computer system 500 may not include video display unit 510, input device 512, and/or cursor control device 514 (e.g., in a headless configuration).

The data storage device 518 can include a non-transitory machine-readable storage medium 524 (also computer-readable storage medium) on which is stored one or more sets of instructions 505 (e.g., for using machine learning to estimate (e.g., identify) different sound sources from audio mixtures) embodying any one or more of the methodologies or functions described herein. The instructions can also reside, completely or at least partially, within the main memory 504 and/or within the processor 502 during execution thereof by the computer system 500, the main memory 504 and the processor 502 also constituting machine-readable storage media. The instructions can further be transmitted or received over a network 530 via the network interface device 508.

In one implementation, the instructions 505 include instructions for using machine learning to estimate (e.g., identify) different sound sources from audio mixtures. While the computer-readable storage medium 524 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms “component,” “module,” “system,” or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a “device” can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words “example” or “exemplary” are used herein to mean serving as an example, instance, or illustration. Any aspect or design described herein as “exemplary” is not necessarily to be construed as preferred or advantageous over other aspects or designs. Rather, use of the words “example” or “exemplary” is intended to present concepts in a concrete fashion. As used in this application, the term “or” is intended to mean an inclusive “or” rather than an exclusive “or.” That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. In addition, the articles “a” and “an” as used in this application and the appended claims should generally be construed to mean “one or more” unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:

receiving audio input comprising mixed audio signals provided by one or more client devices of one or more users of a video conference platform that participate in a video conference;

converting the audio input into a plurality of discrete tokens comprising one or more of a plurality of acoustic tokens, which capture at least sound events or acoustic characteristics within the mixed audio signals, or a plurality of semantic tokens, which are derived from text data extracted from the mixed audio signals and capture at least associated meanings and contextual representations of words or subword units, wherein converting the audio input into the plurality of discrete tokens comprises:

providing, to a first machine learning model, input comprising the audio input; and obtaining, from the first machine learning model, one or more outputs identifying the plurality of discrete tokens; and determining, using a second machine learning model, a plurality of sound sources each corresponding to a subset of discrete tokens of a plurality of subsets of discrete tokens, wherein a transcript of at least one of the plurality of sounds sources is generated for the video conference.

2. The method of claim 1, wherein the plurality of discrete tokens comprises the plurality of semantic tokens, and wherein the one or more outputs identify the plurality of semantic tokens.

3. The method of claim 1, wherein the plurality of discrete tokens comprises the plurality of acoustic tokens, and wherein the one or more outputs identify the plurality of acoustic tokens.

4. The method of claim 1, further comprising:

providing, to the second machine learning model, first input comprising the plurality of discrete tokens and second input comprising another plurality of discrete tokens, wherein each of the plurality of discrete tokens and the other plurality of discrete tokens comprises at least one of: the plurality of acoustic tokens or the plurality of semantic tokens.

5. The method of claim 1, further comprising:

providing, to the second machine learning model, input comprising at least one or more of: one or more transcripts corresponding to the audio input, one or more audio descriptions corresponding to the audio input, one or more class identities corresponding to the audio input, or one or more captions corresponding to the audio input.

6. The method of claim 1, further comprising:

obtaining, from the second machine learning model, one or more outputs identifying one or more transcripts corresponding to the audio input.

7. The method of claim 1, further comprising:

providing, to a third machine learning model, input comprising a plurality of waveforms corresponding to the audio input, wherein the plurality of waveforms is generated using a time-domain convolutional neural network, and wherein the plurality of waveforms pertains to a first sound source of the plurality of sound sources;

obtaining, from the third machine learning model, one or more outputs identifying a first plurality of acoustic tokens corresponding to the plurality of waveforms;

providing, to the second machine learning model, second input comprising the first plurality of acoustic tokens corresponding to the plurality of waveforms; and obtaining, from the second machine learning model, one or more outputs identifying a second plurality of acoustic tokens, wherein the second plurality of acoustic tokens comprises the first plurality of acoustic tokens with a removal of one or more distortions or artifacts from the first plurality of acoustic tokens.

8. A system comprising:

a memory device; and a processing device coupled to the memory device, the processing device to perform operations comprising:

receiving audio input comprising mixed audio signals provided by one or more client devices of one or more users of a video conference platform that participate in a video conference;

converting the audio input into a plurality of discrete tokens comprising one or more of a plurality of acoustic tokens, which capture at least sound events or acoustic characteristics within the mixed audio signals, or a plurality of semantic tokens, which are derived from text data extracted from the mixed audio signals and capture at least associated meanings and contextual representations of words or subword units, wherein converting the audio input into the plurality of discrete tokens comprises:

providing, to a first machine learning model, input comprising the audio input; and obtaining, from the first machine learning model, one or more outputs identifying the plurality of discrete tokens; and determining, using a second machine learning model, a plurality of sound sources each corresponding to a subset of discrete tokens of a plurality of subsets of discrete tokens, wherein a transcript of at least one of the plurality of sounds sources is generated for the video conference.

9. The system of claim 8, wherein the plurality of discrete tokens comprises the plurality of semantic tokens, and wherein the one or more outputs identify the plurality of semantic tokens.

10. The system of claim 8, wherein the plurality of discrete tokens comprises the plurality of acoustic tokens, and wherein the one or more outputs identify the plurality of acoustic tokens.

11. The system of claim 8, wherein the operations further comprise:

providing, to the second machine learning model, first input comprising the plurality of discrete tokens and second input comprising another plurality of discrete tokens, wherein each of the plurality of discrete tokens and the other plurality of discrete tokens comprises at least one of: the plurality of acoustic tokens or the plurality of semantic tokens.

12. The system of claim 8, wherein the operations further comprise:

obtaining, from the second machine learning model, one or more outputs identifying one or more transcripts corresponding to the audio input.

13. A non-transitory computer readable medium comprising instructions, which when executed by a processing device, cause the processing device to perform operations comprising:

receiving audio input comprising mixed audio signals provided by one or more client devices of one or more users of a video conference platform that participate in a video conference;

converting the audio input into a plurality of discrete tokens comprising one or more of a plurality of acoustic tokens, which capture at least sound events or acoustic characteristics within the mixed audio signals, or a plurality of semantic tokens, which are derived from text data extracted from the mixed audio signals and capture at least associated meanings and contextual representations of words or subword units, wherein converting the audio input into the plurality of discrete tokens comprises:

providing, to a first machine learning model, input comprising the audio input; and obtaining, from the first machine learning model, one or more outputs identifying the plurality of discrete tokens; and determining, using a second machine learning model, a plurality of sound sources each corresponding to a subset of discrete tokens of a plurality of subsets of discrete tokens, wherein a transcript of at least one of the plurality of sounds sources is generated for the video conference.

14. The non-transitory computer readable medium of claim 13, wherein the plurality of discrete tokens comprises the plurality of semantic tokens, and wherein the one or more outputs identify the plurality of semantic tokens.

15. The non-transitory computer readable medium of claim 13, wherein the plurality of discrete tokens comprises the plurality of acoustic tokens, and wherein the one or more outputs identify the plurality of acoustic tokens.

16. The non-transitory computer readable medium of claim 13, the operations further comprising:

providing, to the second machine learning model, first input comprising the plurality of discrete tokens and second input comprising another plurality of discrete tokens, wherein each of the plurality of discrete tokens and the other plurality of discrete tokens comprises at least one of: the plurality of acoustic tokens or the plurality of semantic tokens.

17. The non-transitory computer readable medium of claim 13, the operations further comprising:

providing, to the second machine learning model, input comprising at least one or more of: one or more transcripts corresponding to the audio input, one or more audio descriptions corresponding to the audio input, one or more class identities corresponding to the audio input, or one or more captions corresponding to the audio input.

18. The non-transitory computer readable medium of claim 13, the operations further comprising:

obtaining, from the second machine learning model, one or more outputs identifying one or more transcripts corresponding to the audio input.

19. The non-transitory computer readable medium of claim 13, the operations further comprising:

providing, to a third machine learning model, input comprising a plurality of waveforms corresponding to the audio input, wherein the plurality of waveforms is generated using a time-domain convolutional neural network, and wherein the plurality of waveforms pertains to a first sound source of the plurality of sound sources;

obtaining, from the third machine learning model, one or more outputs identifying a first plurality of acoustic tokens corresponding to the plurality of waveforms;

providing, to the second machine learning model, second input comprising the first plurality of acoustic tokens corresponding to the plurality of waveforms; and obtaining, from the second machine learning model, one or more outputs identifying a second plurality of acoustic tokens, wherein the second plurality of acoustic tokens comprises the first plurality of acoustic tokens with a removal of one or more distortions or artifacts from the first plurality of acoustic tokens.

* * * * *